United States Patent [19]

Nakano et al.

[11] Patent Number: 5,270,353
[45] Date of Patent: Dec. 14, 1993

[54] RESIN COMPOSITION

[75] Inventors: Akikazu Nakano; Takashi Sumitomo, both of Ichihara; Komei Yamasaki, Sodegaura; Keisuke Funaki, Ichihara, all of Japan

[73] Assignee: Idemitsu Kosan Co., Ltd., Tokyo, Japan

[21] Appl. No.: 782,746

[22] Filed: Oct. 18, 1991

Related U.S. Application Data

[63] Continuation of Ser. No. 466,678, Jan. 17, 1990, abandoned.

[30] Foreign Application Priority Data

| Feb. 10, 1989 | [JP] | Japan | 1-29680 |
| Feb. 21, 1989 | [JP] | Japan | 1-39353 |
| Mar. 31, 1989 | [JP] | Japan | 1-78166 |

[51] Int. Cl.$^5$ ............ C08K 9/04; C08K 9/06
[52] U.S. Cl. ................ 523/214; 428/375; 428/391; 523/200; 523/205; 523/212; 523/213; 523/216; 525/66; 525/88; 525/166; 525/179
[58] Field of Search ............... 525/208; 523/200, 214, 523/212, 213, 216, 71

[56] References Cited

U.S. PATENT DOCUMENTS

| 3,619,229 | 11/1971 | Hartlein | 523/214 |
| 3,966,389 | 6/1976 | Sims | 525/179 |
| 4,414,342 | 11/1983 | Falk et al. | 523/437 |
| 4,663,369 | 5/1987 | Kawai et al. | 523/203 |
| 4,680,353 | 7/1987 | Ishihara et al. | 526/160 |
| 4,891,399 | 1/1990 | Ohkawa et al. | 523/200 |

FOREIGN PATENT DOCUMENTS

| 0276988 | 8/1988 | European Pat. Off. | |
| 55-161836 | 12/1980 | Japan | |
| 0098353 | 6/1983 | Japan | 523/214 |
| 62-257948 | 11/1987 | Japan | |
| 62-257950 | 11/1987 | Japan | |
| 1-036638 | 2/1989 | Japan | 523/214 |
| 1-201350 | 8/1989 | Japan | |

OTHER PUBLICATIONS

Chemical Abstracts, vol. 104, No. 8, Feb. 24, 1986, p. 48, abstract No. 51817c, Columbia, Ohio, US; & JP-A-60 195 157 (Mitsubishi Chemical Industries Co., Ltd.), Mar. 10, 1985 *Abstract*.

Chemical Abstracts, vol. 106, No. 24, Jun. 5, 1987, p. 39, abstract No. 197329a, Columbus, Ohio, US; & JP-A-61 204 270 (Toyobo Co., Ltd.) Oct. 9, 1986 *Abstract*.

*Primary Examiner*—Ana L. Carillo
*Attorney, Agent, or Firm*—Oblon, Spivak, McClelland, Maier & Neustadt

[57] ABSTRACT

Disclosed is a resin composition which comprises (a) 5 to 95% by weight of a styrene-based polymer having a syndiotactic configuration, (b) 95 to 9% by weight of a thermoplastic resin having at least one polar group selected from a carboxyl group, a hydroxyl group and an amino group at the terminal; and (c) 0.01 to 15 parts by weight of a styrene-based copolymer obtained by copolymerizing a styrene compound with a vinyl compound having an epoxy group or a styrene-based copolymer obtained by copolymerizing a styrene compound with an $\alpha,\beta$-unsaturated carboxylic acid anhydride based on 100 parts by weight of the aobve components (a) and (b). The composition exhibits no laminar peeling and has an excellent appearance because affinity and dispersibility of the styrene-based polymer and the thermoplastic resin are improved, and a polystyrene-based resin composition improved in mechanical strength can also be obtained without using a complicated process.

6 Claims, No Drawings

RESIN COMPOSITION

This application is a Continuation, Division, Continuation-In-Part, of application Ser. No. 07/466,678, filed Jan. 17, 1990 (abandoned).

BACKGROUND OF THE INVENTION

1. Field of the invention

This invention relates to a resin composition and a surface-treated inorganic filler, and more particularly, to a styrene-based resin composition that is available for heat resistant parts in automobiles, domestic electric appliances and electric and electronic devices, or heat resistant structural materials for industrial use, and an inorganic filler which is surface treated and is suitable for filling in a styrene-based polymer.

2. Description of the Related Arts.

A styrene-based polymer having a syndiotactic configuration shows excellent mechanical strength, heat resistance, solvent resistance and electric characteristics compared with a styrene-based polymer having an atactic configuration. Therefore, in recent years, various studies to formulate a styrene-based polymer having a syndiotactic configuration to improve heat resistance or a solvent resistant thermoplastic resin, have been carried out. For example, Japanese Patent Application Laid-Open No. 257950/1987, discloses a thermoplastic resin composition to which a polystyrene having a syndiotactic configuration is added in order to improve the heat resistance of the thermoplastic resin. However, while the composition obtained certainly has an improved heat resistance, its tensile strength and elongation performance are markedly lowered in a composition with a resin which has less affinity with polystyrene. As a result, the composition is not preferred depending on the use thereof due to its poorer physical properties. Furthermore, there are problems in not only lowering in physical properties but also in its appearance, such as peeling of the surface layer of a molded product.

In order to overcome the above problems, the present inventors previously proposed a technique in which a specific block copolymer is added to improve affinity and dispersibility when blending a styrene-based polymer having a syndiotactic configuration with a thermoplastic resin, which has less affinity for the styrene-based polymer. For example, a polyamide resin has been known to have excellent moldability and heat resistance, and sufficient rigidity. Therefore, it has been used as a molding material for various products such as domestic materials, and parts of electric and mechanical instruments. However, the polyamide resin has a disadvantage in terms of water resistance although it has the excellent properties as mentioned above.

An attempt has been made to overcome the above disadvantage by adding the above styrene-based polymer to the polyamide. When the above styrene-based polymer is blended with the polyamide, a block copolymer of polystyrenepolyamide is added thereto. In addition, when the above styrene-based polymer is blended with a polybutyreneterephthalate, a block copolymer of a polystyrene-polybutyreneterephthalate is added thereto. That is, this technique adds a block copolymer comprising a polystyrene and a resin to be blended with the polystyrene as a modifier. According to this technique, modification effects can be obtained to some extent, and mechanical properties are particularly improved compared with that disclosed in Japanese Patent Publication Laid-Open No. 257950/1987.

However, according to this technique, it is necessary to prepare a block copolymer previously when a blended material is prepared so there is a disadvantage in that complicated procedures are required for industrial production.

On the other hand, an attempt has been made by formulating an inorganic filler such as glass fiber to various synthetic resins to improve mechanical properties, particularly rigidity and heat resistance. However, a styrene-based polymer has insufficient adhesiveness with an inorganic filler, so various investigations have been made concerning additives to improve adhesiveness or a surface treating agent of the inorganic filler. As a result, surface treating agents have been developed such as those in which various aminosilane compounds are combined with resins of polyester, urethane, epoxy, acryl and vinyl acetate, and additives such as maleic acid anhydride-styrene copolymer. More specifically, there have been known a silane coupling agent for glass fiber which is used as a surface treating agent, and a styrene/maleic anhydride-styrene/glass fiber composition as a composition in which an additive is formulated (Japanese Patent Application Laid-Open No. 161836/1980 and Japanese Patent Publication No. 19097/1974). However, the improvements brought about by these have also been inadequate.

In addition, Japanese Patent Publications Laid-Open No. 257948/1987 and No. 182344/1989, proposed resin compositions in which an inorganic filler is added to a syndiotactic polystyrene, and an inorganic filler is added to a syndiotactic polystyrene/a thermo-plastic resin and/or a rubber, respectively, to improve heat resistance and mechanical properties. However, the adhesiveness of the syndiotactic polystyrene and the inorganic filler is also insufficient in these compositions, so improvements have been desired.

That is, in conventional attempts in which the surfaces of various inorganic fillers and additives are treated with various surface treating agents, adhesiveness with a styrene-based polymer, particularly with a syndiotactic polystyrene is insufficient. In particular, impact resistance is low so an improvement in impact resistance has been desired.

SUMMARY OF THE INVENTION

An object of the present invention is to provide a composition which has good affinity and dispersibility from a styrene-based polymer having a syndiotactic configuration and a thermoplastic resin or an inorganic filler having less affinity therewith.

Another object of the present invention is to provide a surface-treated inorganic filler and an additive which can give sufficient strength to the above composition.

A resin composition of the present invention comprises (a) 5 to 95% by weight of a styrene-based polymer having a syndiotactic configuration, (b) 95 to 5% by weight of a thermoplastic resin having at least one polar group selected from a carboxyl group, a hydroxyl group and an amino group at the terminal; and (c) 0.01 to 15 parts by weight of a styrene-based copolymer obtained by copolymerizing a styrene or its derivative with a vinyl compound having an epoxy group or a styrene-based copolymer obtained by copolymerizing a styrene or its derivative with an α,β-unsaturated carboxylic acid anhydride based on 100 parts by weight of the above components (a) and (b).

Furthermore, a styrene-based resin composition of the present invention comprises:

(a) 5 to 95% by weight of the above styrene-based polymer, (b) 95 to 5% by weight of a polyamide, and (e) 1 to 50 parts by weight of at least one block or graft copolymer selected from the group consisting of an A-B block copolymer, an A-grafted B copolymer and a B-grafted A copolymer, each of which is modified by graft polymerizing an unsaturated carboxylic acid or its derivatives, based on 100 parts by weight of the above components (a) and (b), wherein A represents an atactic polystyrene and B represents at least one polymer selected from among polybutadiene, polyisoprene, hydrogenated polybutadiene and hydrogenated polyisoprene.

A styrene-based resin composition of the present invention also comprises, as its main components, (a') 100 parts by weight of a styrene-based polymer having no functional group, (g) 0.01 to 30 parts by weight of a styrene-based polymer having an epoxy group, and (h) 1 to 550 parts by weight of an inorganic filler which is surface-treated with a silane compound or a titanium compound.

Moreover, a surface-treated inorganic filler of the present invention comprises 100 parts by weight of an inorganic filler surface-treated with a mixture comprising (g) 0.1 to 5 parts by weight of a styrene-based polymer having an epoxy group and (i) 0.05 to 1 part by weight of a silane compound or a titanium compound.

DESCRIPTION OF THE PREFERRED EMBODIMENTS

The resin composition of the present invention comprises the main components (a), (b) and (c), or (a), (d) and (e), or (a'), (g) and (h).

Component (a) is a styrene-based resin with a syndiotactic configuration. The styrene-based resin having a syndiotactic configuration refers to a polymer with a stereo structure such that phenyl groups or substituted phenyl groups are located alternately as side chains at opposite positions relative to the main chain composed of carbon-carbon bonds. Tacticity is quantitatively determined by a nuclear magnetic resonance method using a carbon isotope ($^{13}$C-NMR method). The tacticity, as determined by the $^{13}$C-NMR method, is indicated in terms of proportions of structural units continuously connected to each other, i.e., a diad in which two structural units are connected to each other, a triad in which three structural units are connected to each other, and a pentad in which five structural units are connected to each other. The styrene-based resin having a syndiotactic configuration has a syndiotactic configuration, such that the proportion in the racemic diad is at least 75% and is preferably at least 85%, or the proportion in a racemic pentad is at least 30% and is preferably at least 50%. The styrene-based resin includes polystyrene, poly(alkylstyrene), poly(halogenated styrene), poly(alkoxystyrene), poly(vinyl benzoic ester), and their mixtures or copolymers containing the above polymers as the main components.

Poly(alkylstyrene) includes poly(methylstyrene), poly(ethylstyrene), poly(isopropylstyrene), and poly(-tertbutylstyrene). Poly(halogenated styrene) includes poly(chlorostyrene), poly(bromostyrene), and poly(-fluorostyrene). Poly(alkoxystyrene) includes poly(methoxystyrene) and poly(ethoxystyrene). Of these, polystyrene, poly(p-methylstyrene), poly(m-methylstyrene), poly(p-tert-butylstyrene), poly(p-chlorostyrene), poly(m-chlorostyrene), poly(p-fluorostyrene) are the most preferred polymers. Copolymers of styrene and p-methylstyrene are the most preferred copolymers.

The molecular weight of the styrene-based resin of component (a), which is used in the present invention, is not critical. The weight average molecular weight is preferably at least 10,000 and most preferably at least 50,000. the molecular weight distribution can be either wide or narrow, and various kinds of distribution are available.

A styrene-based resin having syndiotactic configuration can be produced, for example, by polymerizing a styrene-based monomer (corresponding to the above styrene-based resin) using a catalyst containing a titanium compound, and a condensate of water and trialkylaluminum in the presence of an inert hydrocarbon solvent or in the absence of a solvent (Japanese Patent Application Laid-Open No. 187708/1987).

The component (b) of the present invention as mentioned above, is a thermoplastic resin having at least one polar group selected from a carboxyl group, a hydroxyl group and an amino group at the terminal(s). The thermoplastic resins include, for example, polyethyleneterephthalate, polypropyleneterephthalate, polybutyreneterephthalate, polycyclohexanedimethyleneterephthalate, polyoxyethoxybenzoate, polyethylenenaphthalate; a polyester prepared by copolymerizing the above polyester-constituting component with another acid component and/or a glycol component, for example, an acid component such as isophthalic acid, p-oxybenzoic acid, adipic acid, sebacic acid, glutar acid, diphenylmethanedicarboxylic acid and dimer acid, and a glycol component such as hexamethyleneglycol, diethyleneglycol, neopentylglycol, bisphenol A and neopentylglycolalkyleneoxide adduct; an aromatic polyesterpolyether block copolymer; an aromatic polyester-polylactone block copolymer; a broadly defined polyester such as polyarylate; a polyamide such as Nylon 4, Nylon 3.4, Nylon 12, Nylon 6.10, Nylon 6, Nylon 6.6, Nylon 6.9, Nylon 5.10, Nylon 6.12, Nylon 6/6.6, Nylon 4.6, polyxylyleneadipamide, polyhexamethyleneterephthalamide, polyphenyleneph thalamide, polyxylyleneadipamide/hexamethyleneadipamide, polyesteramide elastomer, polyetheramide elastomer, polyetheresteramide elastomer and dimeric acid copolymerized amide. Among these, particularly preferred polyesters include polyethyleneterephthalate (PET) and polybutyreneterephthalate (PBT), the polyarylate includes a polyarylate usually known as a U-polymer comprising bisphenol A and terephthalic acid, and the polyamides include Nylon 6, Nylon 6 6 and Nylon 4 6.

The composition of the present invention further comprises, as the component (c), a styrene-based copolymer obtained by copolymerizing a styrene or its derivative with a vinyl compound having an epoxy group or a styrene-based copolymer obtained by copolymerizing a styrene or its derivative with an α,β-unsaturated carboxylic acid anhydride. These styrene-based polymers include those having a weight average molecular weight of 10,000 to 800,000, preferably 50,000 to 500,000. If the weight average molecular weight is less than 10,000, dispersibility cannot be improved and mechanical properties are somewhat reduced. if the weight average molecular weight exceeds 800,000, the viscosity of the composition is also increased, thus moldability is reduced or an independent phase is formed in the composition, and therefore, the improved effects of affinity and dispersibility will be substantially lost.

The vinyl compound having an epoxy group copolymerized with the styrene compound (styrene or its derivative) for preparing the styrene-based polymer, in which the vinyl compound having an epoxy group is copolymerized, includes a copolymerizable unsaturated monomer having an epoxy group such as glycidyl methacrylate, glycidyl acrylate, vinyl glycidyl ether, allyl glycidyl ether, glycidyl ether of hydroxyalkyl (meth)acrylate, glycidyl ether of polyalkyleneglycol (meth)acrylate, glycidyl itaconate. The styrene-based polymer obtained by copolymerizing the copolymerizable unsaturated monomer having an epoxy group can be prepared by conventional bulk polymerization, solution polymerization, suspension polymerization or emulsion polymerization in which a radical polymerization reaction proceeds.

The vinyl compound having an epoxy group is copolymerized in such amount that the proportion of the vinyl compound is 0.01 to 30 mole %, preferably 0.1 to 20 mole % based on the styrene-based copolymer of the component (C). If the amount of the vinyl compound having an epoxy group is less than 0.01 mole %, the effect of improving dispersibility is small and phase peel-off is caused, while if it exceeds 30 mole %, an independent phase is formed so that the improved effects of affinity and dispersibility are substantially lost. Furthermore, gelation is caused, which is considered to be the result of the reaction of the epoxy groups.

Among the styrene-based polymer obtained by copolymerizing the above vinyl compounds having an epoxy group, a copolymer of glycidyl methacrylate and styrene is particularly preferred.

The composition of the present invention may include a styrene-based copolymer obtained by copolymerizing a styrene or a styrene derivative with an $\alpha,\beta$-unsaturated carboxylic acid anhydride, as the component (c). The $\alpha,\beta$-unsaturated carboxylic acid anhydride may be any monomer provided it is copolymerizable with a styrene type compound and includes maleic anhydride, chloromaleic anhydride, citraconic anhydride, butenylsuccinic anhydride, and tetrahydrophthalic anhydride. The styrene-based copolymer obtained by copolymerizing these $\alpha,\beta$-unsaturated carboxylic acid anhydrides can be prepared by conventional bulk polymerization, solution polymerization, suspension polymerization or emulsion polymerization.

The $\alpha,\beta$-unsaturated carboxylic acid anhydride is copolymerized in the styrene-based copolymer in an amount of 0.01 to 5 mole %, preferably 0.1 to 3 mole %, based on the total amount of the copolymer. If the amount of the $\alpha,\beta$-unsaturated unsaturated carboxylic acid anhydride is less than 0.01 mole %, the effect of improving dispersibility is small, and phase peel-off sometimes occurs, while if it exceeds 5 mole %, an independent phase is formed so that the improved affinity and dispersibility are lost.

Among the styrene-based copolymers obtained by copolymerizing the above $\alpha,\beta$-unsaturated carboxylic acid anhydride with the styrene compound, a copolymer of maleic anhydride and styrene is particularly preferred. The copolymer is commercially available as Moremax series produced by Idemitsu Petrochemical Co., Ltd.

In the resin composition of the present invention, 5 to 95% by weight, preferably 10 to 90% by weight of the styrene-based polymer having a syndiotactic configuration as the above component (a) and 95 to 5% by weight, preferably 90 to 10% by weight of the thermoplastic resin as component (b) are blended. If the amount of the thermoplastic resin exceeds 95% by weight, heat resistance, rigidity and chemical resistance of the resulting composition are lowered, while if it is less than 5% by weight, mechanical properties are lowered.

The resin composition of the present invention (first invention) is prepared by adding 0.01 to 15 parts by weight, preferably 0.1 to 10 parts by weight of the component (c) to 100 parts by weight of the mixture containing the above components (a) and (b), in the ratio defined above. If the amount of component (c) is less than 0.01 part by weight, the effect of improving dispersibility is small, while if it exceeds 15 parts by weight, it is more than required, thus causing gelation or impairing heat resistance.

When the resin component which is blended with the styrene-based polymer having syndiotactic configuration is a polyamide, there may be mentioned, as preferred resin compositions, a resin composition which mainly comprises (a) 5 to 95% by weight of a styrene-based polymer having a syndiotactic configuration, (d) 95 to 5% by weight of the polyamide and (e) 1 to 50 parts by weight of at least one of a block and graft copolymer selected from the group consisting of the A-B type block copolymer, the A-grafted B copolymer and the B-grafted A copolymer (wherein A and B have the same meanings as defined above), each of which is modified by graft polymerizing an unsaturated carboxylic acid or its derivatives, based on 100 parts by weight of (a) and (d) above components (hereinafter referred to as the second invention), and a resin composition which mainly comprises (a) 5 to 95% by weight of the styrene-based polymer having a syndiotactic configuration, (d) 95 to 5% by weight of the polyamide, and (e) X part by weight of at least one of a block and graft copolymer selected from the group consisting of the A-B type block copolymer, the A-grafted B copolymer and the B-grafted A copolymer (wherein A and B have the same meanings as those defined above), each of which is modified by graft polymerizing an unsaturated carboxylic acid or its derivatives and (f) Y part by weight of at least one of a block and graft copolymers selected from the group consisting of the A-B type block copolymer, the A-grafted B copolymer and the B-grafted A copolymer (wherein A and B have the same meanings as those defined above; and X and Y satisfy the relations of 1 part by weight $\leq X+Y \leq 50$ parts by weight,
1 part by weight $\leq X \leq 50$ parts by weight, and
0 part by weight $\leq Y \leq 49$ parts by weight, simultaneously), based on 100 parts by weight of the components (a) and (d) above (hereinafter referred to as the third invention).

The resin composition of the second invention comprises the main components (a), (d) and (e) as described above. The component (a) is a styrene-based polymer having the syndiotactic configuration mentioned above.

The polyamide to be used as the component (d) is not particularly limited and includes polyamides obtained by copolymerizing a diamine with a dicarboxylic acid, self-condensing an ω-amino acid, and ring-opening polymerizing a lactam. More specifically, there may be mentioned polyhexamethyleneadipamide, polyhexamethyleneazeramide, polyhexamethylenesebacamide, polyhexamethylenedodecanoamide, polybis(4-aminocyclohexyl)methanedodecanoamide, polycaprolactam, polylauric lactam, poly-11-aminoundecanoic acid, methaxylyleneadipamide and copolymers thereof. The molecular weight of the polyamide is not particularly limited provided it is sufficient to form a molded product, and it can be optionally selected depending on the molded product to be formed or the molding method. It is generally 5,000 to 200,000, preferably 7,000 to 100,000 in number average molecular weight. If the molecular weight is too small, molding becomes difficult, and is therefore not preferred.

With respect to the blending ratio of components (a) and (d) in the above resin composition, 5 to 95% by weight, preferably 15 to 85% by weight of component (a) and 95 to 5% by weight, preferably 85 to 15% by weight of component (d) based on the total amount of (a) and (d) components are blended. If the amount of the styrene-based polymer having a syndiotactic configuration of component (a) is less than 5% by weight, the durability and the mechanical strength of the resulting composition are reduced, while if it exceeds 95% by weight, the hot water and steam resistance of the composition becomes insufficient.

The composition above further contains the block or graft copolymer as component (e), which is modified by graft copolymerizing unsaturated carboxylic acid or its derivatives. In component (e), various block copolymers can be used for modification. When the block copolymer is represented by A-B type, A is an atactic polystyrene and B is at least one or more polymer selected from among polybutadiene, polyisoprene, hydrogenated polybutadiene and hydrogenated polyisoprene.

Furthermore, in component (e), various graft copolymers can be modified, and when the graft copolymer used is represented by A and B above, it can be represented as a A-grafted B copolymer or a B-grafted A copolymer.

As component (e) of the resin composition the A-B block copolymer, the A-grafted B copolymer and B-grafted A copolymer can be used alone or combined.

In the above copolymer, the contents of A and B are not particularly limited, but 10 to 70 mole % of A and 90 to 30 mole % of B are preferred. If the content of A is less than 10 mole %, affinity with the styrene-based polymer is poor, while if it exceeds 70 mole %, the softness characteristic of the resulting composition is poor.

The block or graft copolymer mentioned herein are the same as the component (f) in the third invention mentioned below.

The component (e) above is modified by graft copolymerizing the unsaturated carboxylic acid or derivatives thereof to the above block or graft copolymer.

The unsaturated carboxylic acid and derivatives thereof include unsaturated monocarboxylic acids such as acrylic acid, methacrylic acid and α-ethylacrylic acid; and unsaturated dicarboxylic acids such as maleic acid, fumaric acid, itaconic acid, citraconic acid, tetrahydrophthalic acid, methyltetra-hydrophthalic acid, endosis-bicyclo (2.2.1) hept-5-en-2,3-dicarboxylic acid and methyl-endosis-bicyclo (2.2.1) hept-5-en-2,3-dicarboxylic acid.

Furthermore, derivatives of these unsaturated carboxylic acids such as acid halides, amides, imides, acid anhydrides and esters thereof are also used. More specifically, maleanil chloride, maleimide, maleic anhydride, chloromaleic anhydride, butenylsuccinic anhydride, tetrahydrophthalic anhydride, citraconic anhydride, monomethyl maleate, dimethyl maleate and glycidyl maleate. Among these, particularly preferred are unsaturated dicarboxylic acids and acid anhydrides thereof.

The component (e) of the composition is prepared by modifying the above block or graft copolymer by copolymerizing it with the above unsaturated carboxylic acid or derivatives thereof. Component (e) can be prepared by the preparative method which is conventionally used for producing a graft copolymer. The amount of the unsaturated carboxylic acid or derivatives thereof is not particularly limited, but is usually 0.01 to 10% by weight, preferably 0.05 to 5% by weight based on the block or graft copolymer. If the amount is less than 0.01% by weight, the mechanical properties of the resulting composition will be insufficient. While, if it exceeds 10% by weight, its reaction with component (d) will excessively proceed, causing gelation, and particularly in the third invention mentioned below, its affinity with the component (f) becomes poor.

In order to carry out graft copolymerization efficiently, the reaction is preferably carried out in the presence of a radical initiator. The radical initiators to be used include organic peroxides and diazo compounds, which are usually used. More specifically, they include benzoylperoxide, dicumylperoxide, di-tert-butylperoxide, tert-butylcumylperoxide, tert-butylhydroperoxide, cumenehydroperoxide and azobisisobutyronitrile. The amount of the radical initiators is 0.01% by weight or more, preferably 0.03 to 1% by weight based on the graft copolymer.

More specifically, the following preparatory process may be mentioned. (1) A method in which a radical initiator and an unsaturated carboxylic acid or its derivative are added to a solution containing a block or graft copolymer, and the reaction is carried out by stirring at 40° to 200° C. for from several ten minutes to several hours or (2) a method in which each component was fused and kneaded in the absence of a solvent at 130° to 350° C. for from 20 seconds to 30 minutes, preferably from 40 seconds to 5 minutes.

Component (e) above is contained in the resin composition of the present invention in an amount of 1 to 50 parts by weight, preferably 5 to 30 parts by weight based on 100 parts by weight of components (a) and (b). If the amount of component (e) is less than 1 part by weight, the reinforcing effect of an interface between the components (a) and (b) is insufficient and its impact resistance is reduced, which if it exceeds 50 parts by weight, the rigidity of the composition is impaired, and gelation due to excessive reaction and surface roughness of the molding material are caused.

The composition of the second invention is a resin composition comprising components (a), (d) and (e) above in predetermined amounts, respectively.

The composition of the third invention is a resin composition blended, in addition to the above components (a), (d) and (e), a block or graft copolymer as the component (f). Component (f) is an unmodified block or graft copolymer which is component (e) before being modifying with the unsaturated carboxylic acid or its derivatives by graft copolymerization, and in the same as that mentioned above.

In the third invention, the blending ratios of components (a) and (d) are the same as that of the second invention. Furthermore, X part by weight of component (e) and Y part by weight of component (f) are blended to 100 parts by weight of components (a) and (b) to obtain the resin composition of the present invention. Here, X and Y should satisfy the following relationships simultaneously.

1 part by weight $\leq X+Y \leq 50$ parts by weight,
1 part by weight $\leq X \leq 50$ parts by weight and
0 part by weight $\leq Y \leq 49$ parts by weight.

The total amount of $X+Y$ of the components (e) and (f) is 1 to 50 parts by weight, preferably 5 to 40 parts by weight. If the total amount of $X+Y$ is less than 1 part by weight, the impact resistance of the composition is reduced, while if it exceeds 50 parts by weight, the rigidity of the composition is low and moldability is poor. In addition, X is 1 to 50 parts by weight, preferably 5 to 40 parts by weight. If the amount X is less than 1 pars by weight, compatibility cannot be improved and impact resistance is also reduced. On the other hand, if it exceeds 50 parts by weight, rigidity and moldability are poor. Furthermore, the amount Y is 0 to 49 parts by weight, preferably 0 to 39 parts by weight. If it exceeds 49 parts by weight, rigidity and moldability are poor.

The resin composition of third invention can be obtained by blending components (a), (d), (e) and (f) in predetermined amounts.

The resin composition of the present invention basically comprises the above components, but various rubber-like polymers and/or inorganic fillers which are surface-treated as mentioned below or an untreated one, or various additives other than the above such as antioxidants, nuclear agents and lubricants can be used provided they do not impair the objects of the invention. Various rubber-like polymers can be used, but the most preferred is a rubber-like copolymer containing a styrene compound as a component such as a styrene-butadiene block copolymer rubber, a rubber in which a part or all of the butadiene portion of the styrene-butadiene block copolymer is hydrogenated, a styrene-butadiene copolymer rubber, a methyl acrylate-butadiene-styrene copolymer rubber, an acrylonitrile-butadiene-styrene copolymer rubber, and a methyl acrylate-acrylic acid-2-ethylhexyl acrylate-styrene copolymer rubber. These rubbers have good dispersibility with the styrene-based polymer having a syndiotactic configuration as component (a), because they contain styrene units. As a result, their physical properties are markedly improved.

The rubber-like polymers include natural rubber, polybutadiene, polyisoprene, polyisobutyrene, Neoprene, ethylen-propylene copolymer rubber, polysulfide rubber, Thiokol rubber, acrylic rubber, urethane rubber, silicone rubber, and epichlorohydrin rubber.

In addition, the following (1) to (3) can be used as the rubber-like polymer. That is, there is (1) a resin polymer obtained by polymerizing at least one or more vinyl type monomers in the presence of a rubber-like polymer mainly comprising alkyl acrylate and/or alkyl methacrylate (alkyl acrylates). Here, the rubber-like polymer mainly comprising alkylacrylates is a copolymer obtained by reacting 70% by weight or more of the said alkyl acrylates with 30% by weight or less of the other vinyl monomer, which can be copolymerized with methyl methacrylate, acrylonitrile, vinyl acetate, styrene, etc. In this case, a polymer obtained by optionally adding a polyfunctional monomer such as divinylbenzene, ethylene dimethacrylate, triallyl cyanurate, triallyl isocyanurate as a cross-linking agent, and reacting them can also be contained. Specific examples of the rubber-like polymer to be included in (1) above include MAS elastomer (prepared by adding styrene to a rubber latex obtained by copolymerizing methyl methacrylate and butyl acrylate, and effecting graft copolymerization (commercially available products include EXL-2330 (trade mark) produced by Rohm & Haas Co., or M-101 (trade mark) produced by Kanegafuchi Chemical Industry Co., Ltd.).

There is also a resin polymer (2) prepared by polymerizing a copolymer obtained by copolymerizing alkyl acrylate and/or alkyl methacrylate and polyfunctional polymerizable monomer having a conjugated diene-type double bond with at least one vinyl type monomer. In order to obtain this copolymer, the vinyl monomer and a cross-linking agent can be added as in (1) above. Specific examples of rubber-like polymer belonging to the (2) above include an MABS elastomer such as a graft copolymer prepared by adding styrene and methyl methacrylate to a rubber latex, obtained by copolymerizing octyl acrylate and butadiene with a ratio of the former : the latter $=7:3$, and then performing graft copolymerization; or an MBS elastomer (as commercially available produce, Metaburene C-223, (trade mark) produced by Mitsubishi Rayon Co., Ltd.), such as a graft copolymer prepared by adding styrene to a rubber latex, obtained by copolymerizing methyl methacrylate and butadiene, and then effecting graft copolymerization.

Furthermore, (3) may be mentioned as the other elastomer, or AABS elastomer (prepared by adding acrylonitrile and styrene to a rubber latex obtained by copolymerizing butadiene and alkyl acrylate, and then performing graft copolymerization), or SBR elastomer (prepared by adding styrene to polybutadiene and performing graft-copolymerization).

Moreover, in the present invention, it is preferred to formulate (a') 100 parts by weight of a styrene-based polymer having no functional group, (g) 0.01 to 30 parts by weight of a styrene-based polymer having an epoxy group and (h) 1 to 550 parts by weight of an inorganic filler surface-treated with a silane compound or a titanium compound. The inorganic filers in which 100 parts by weight of an inorganic filler is surface-treated with (g) 0.1 to 5 parts by weight of a styrene-based polymer having an epoxy group and (i) 0.05 to 1 part by weight of a silane compound or a titanium compound are also preferred.

A styrene-based polymer having no functional group to be used as component (a') may be any styrene-based polymer, provided it does not have a functional group, and those containing at least 25% by weight of a recurring unit derived from a vinyl aromatic compound represented by the formula:

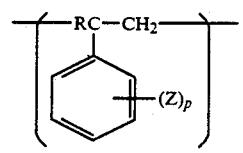

(wherein R represents hydrogen atom or an alkyl group having 1 to 4 carbon atoms, Z represents hydrogen atom, a halogen atom or an alkyl group having 1 to 4 carbon atoms; and p is an integer of 1 to 5) in the polymer can be used. The styrene-based polymer includes, for example, a styrene polymer or its derivatives and, for example, a styrene-based polymer modified with a natural or synthetic elastomer such as polybutadiene, polyisoprene, butyl rubber, EPDM, ethylene-propylene copolymer, natural rubber and epichlorohydrin, or a copolymer containing styrene such as styrene-methyl styrene copolymer and styrene-butatiene copolymer. Among these, the styrene-based polymer above having syndiotactic configuration, atactic polystyrene, isotactic polystyrene, polybutadiene-modified styrene-based polymer, butadiene-styrene copolymer and isoprene-styrene copolymer are particularly preferred.

The styrene-based polymer having an epoxy group as the component (g) is to be used for treating the surface of the inorganic filler and as an additive to the resin. This component (g) is soluble in various solvents same as a silane compound or a titanium compound, which are component (i) mentioned below, and are compatible with the styrene-based polymer to be used for the surface-treated inorganic filler. Specific examples of component (g) above include those prepared by copolymerizing a styrene or a styrene derivative with a vinyl compound having an epoxy group, or those prepared by copolymerizing a vinyl compound having an epoxy group with a styrene-based polymer.

Vinyl compounds having an epoxy group include, for example, glycidyl methacrylate, glycidyl acrylate, vinyl glycidyl ether, glycidyl ether of hydroxyalkyl (meth)acrylate, glycidyl ether of polyalkyleneglycol (meth)acrylate and glycidyl itaconate. Glycidyl methacrylate is particularly preferred. The styrene-based polymer, which is copolymerized with these vinyl compound can be prepared by the various conventionally known methods. For example, it can be prepared by copolymerizing a vinyl compound having an epoxy group with a styrene or styrene derivative in the presence of a radical initiator, or by graft polymerizing a vinyl compound having an epoxy group with a styrene-based polymer in the presence of an organic peroxide.

Specific examples of the styrene-based polymer which is copolymerized with the vinyl compound having an epoxy group include polymers prepared by reacting the vinyl compound having an epoxy group with the styrene-based polymer having a syndiotactic configuration, atactic polystyrene, isotactic polystyrene, polybutadiene-modified styrene-based polymer, butadiene-styrene copolymer or isoprene-styrene copolymer under heating or in the presence of a peroxide; and a styrene-glycidyl methacrylate copolymer prepared by polymerizing styrene, and glycidyl methacrylate in the presence of a radical initiator. Among these, the styrene-glycidyl methacrylate copolymer is particularly preferred.

The styrene-based polymer which is copolymerized with the vinyl compound having an epoxy group can be prepared as mentioned above, but the vinyl compound unit having an epoxy group is preferably contained in the copolymer in an amount of 0.01 to 40 mole %, particularly preferable is 0.1 to 20 mole %, and the weight average molecular weight thereof is 1,000 to 500,000, particularly preferable is 5,000 to 300,000. Here, the amount of the vinyl compound unit having an epoxy group is less than 0.01 mole % in the copolymer, the effect of improving adhesiveness of the styrene-based polymer having no functional group as component (a') and the inorganic filler cannot be obtained in some cases. Conversely, if it exceeds 40 mole %, compatibility with a styrene-based polymer having no functional group as a component (a') becomes poor, thereby impairing the mechanical properties. If the weight average molecular weight of the styrene-based polymer having an epoxy group is also less than 1,000, the effect of improving its adhesiveness cannot be obtained in some cases, while if it exceeds 500,000, dispersibility in the composition becomes poor some times. The amount of the vinyl compound unit having an epoxy group is that calculated from an epoxy equivalent measured according to JIS K 7236.

Next, the compounds to be used for surface-treating the silane compound or the titanium compound of component (i) and the inorganic filler of the component (h) are to be used as a coupling agent to improve the adhesiveness of the inorganic filler with the styrene-based polymer having an epoxy group as the component (g) above. Such compounds can be used optionally by selecting from those conventionally known as silane-type coupling agents and titanium-type coupling agents. Specific examples of the silane-type coupling agent include triethoxysilane, vinyltris (β-methoxyethoxy)silane, γ-methacryloxypropyltrimethoxysilane, γ-glycidoxypropyltrimethoxysilane, β-(1,1-epoxycyclohexyl) ethyltrimethoxysilane, N-β-(aminoethyl)-β-aminopropylmethoxy dimethoxysilane, N-β-(aminoethyl)-γ-aminopropyldimethylsilane, γ-aminopropyltriethoxysilane. N-phenyl-β-aminopropyltrimethoxysilane, γ-mercaptopropyltrimethoxysilane, γ-chloropropyltrimethoxysilane, γ-aminopropyltrimethoxysilane, γ-aminopropyl-tris(2-methoxyethoxy)silane, N-methyl-γ-aminopropyltrimethoxysilane, N-vinylbenzyl-γ-aminopropyltriethoxysilane, triaminopropyltrimethoxysilane, 3-ureidopropyltrimethoxysilane, 3-4,5-dihydroimidazolpropyltriethoxysilane, hexamethyldisilazane, N,O-(bistrimethylsilyl)amide and N,N-bis(trimethylsilyl)urea. Among these, aminosilane and epoxysilane such as γ-aminopropyltriethoxysilane, N-β-(aminoethyl)-γ-aminopropylmethyldimethoxysilane, γ-glyoidoxylpropyltrimethoxysilane, β-(3,4-epoxycyclohexyl)ethyltrimethoxysilane are preferred.

In addition, specific examples of the titanium-type coupling agents include isopropyltriisostearoyltitanate, isopropyltridodecylbenzenesulfonyltitanate, isopropyltris-(dioctylpyrophosphate)titanate, tetraisopropylbis(-dioctylphosphite)titanate, tetraoctylbis(ditridecylphosphite) titanate, tetra(1,1-diallyloxymethyl-1-butyl)-bis(ditridecyl) phosphitetitanate, bis(dioctylpyrophosphate)oxyacetatetitanate, bis(dioctylpyrophosphate)ethylenetitanate, isopropyltrioctanoyl titanate, isopropyldimethacrylisostearoyl titanate, isopropylisostearoyldiacryl titanate, isopropyltri-(dioctylphosphate)-titanate, isopropyltricumylphenyltitanate, isopropyltri(n-aminoethylaminoethyl)titanate, dicumylphenyloxyacetate titanate and diisostearoylethylenetitanate. Among these, isopropyltri(N-aminoethylaminoethyl)titanate is preferred.

The inorganic filer to be used in the present invention may be a fiber, a granule or a powder. Fibrous inorganic fillers include, for example, glass fiber, carbon fiber and alumina fiber, of which glass fiber and carbon fiber are preferred. The glass fiber may be cloth-like, mat-like, chopped strand, short fiber and filaments, and in case of the chopped strand, preferred state is a length of 0.05 mm to 50 mm and a fiber diameter of 5 to 20 μm. In addition, the carbon fiber is preferably a polyacrylonitrile (PAN).

On the other hand, granular and powder inorganic fillers include, for example, talc, carbon black graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide and metal powder. Talc, calcium carbonate and mica are particularly preferred among these. The preferred average particle size of talc is 0.3 to 20 μm, more preferably 0.6 to 10 μm. The preferred average particle size of calcium carbonate is 0.1 to 20 μm. In addition, the preferred average particle size of mica is 40 to 250 μm, more preferably 50 to 150 μm.

Among the above various inorganic fillers, glass fillers such as glass powder, glass flakes, glass beads, glass filament, glass fiber, glass roving and glass mat are particularly preferred.

In the present invention, the above surface-treated inorganic filler is blended in the composition in an amount of 1 to 550 parts by weight, preferably 5 to 200 parts by weight based on 100 parts by weight of the styrene-based polymer having no functional group. If the amount of the surface-treated inorganic filler is less than 1 part by weight, the filler will not be sufficiently effective. On the other hand, if it exceeds 550 parts by weight, dispersibility is poor, making molding difficult.

In addition to the method by which the styrene-based polymer having an epoxy group an component (g) is added to the resin composition comprising the styrene-based polymer having no functional group as component (a'), and the inorganic filler which is surface-treated with a silane or titanium compound, there is the method by which the styrene-based compound having an epoxy group as component (g) and the surface-treated inorganic filler which is surface-treated with a silane or titanium compound as component (i) are previously added to the styrene-based polymer having no functional group, and the latter is also preferred because the adhesiveness between the resin and the inorganic filler can be improved.

The surface-treated inorganic filler can be prepared by, for example, coating a solution comprising components (g) and (i), and various solvents and/or water on the inorganic filler.

During this treatment, the amount of components (g) and (i) to be coated on the inorganic filler are 0.1 to 5 parts by weight, preferably 0.5 to 2 parts by weight based on 100 parts by weight of the above inorganic filler. If the amount of component (g) to be coated is less than 0.1 part by weight, the inorganic filler cannot be coated uniformly, therefore, sufficient adhesive strength cannot be obtained when blended in the resin. As a result, the strengths of the resin products are sometimes reduced. If it exceeds 5 parts by weight, the inorganic filler also has poor dispersibililty in the composition, therefore the strength of the resin product is reduced.

The silane compound or the titanium compound of component (i) is coated on the inorganic filler in an amount of 0.05 to 1.0 part by weight, preferably 0.1 to 0.5 part by weight based on 100 parts by weight of the inorganic filler. If the amount of the component (i) is less than 0.05 parts by weight, adhesiveness is markedly reduced, while if it is blended in excess of 1 part by weight, increased adhesiveness cannot be expected.

Surface treatment of the inorganic filler using components (g) and (i) above can be carried out by the conventional method and is not particularly limited. For example, it can be carried out by optional methods such as sizing treatment, in which components (g) and (i), dissolved or suspended in organic solvents, are coated on the inorganic filler as the sizing agent,; dry mixing using a Henschel mixer, a super mixer, or a V-shaped blender; the spray method; the integral blend method and the dry concentrate method, depending on the form of the inorganic filler, but preferably carried out by sizing treatment, dry mixing and spray method.

In addition, a film-forming substance for a glass can be used together with the silane-type coupling agent above. The film forming substance is not particularly limited and includes polymers of polyester, urethane, epoxy, acrylic and vinyl acetate.

Furthermore, in order to prevent abrasion of the inorganic filler, various known lubricants can be added.

According to the above, the surface-treated inorganic filler of the present invention can be obtained. This surface-treated inorganic filler can be used as a filler for various resins such as polypropylene, polycarbonate and polyethylene, and is particularly preferred as a filler for blending with a styrene-based polymer having no functional group. In order to improve the mechanical properties of the styrene-based polymer having no functional group by blending the surface-treated inorganic filler, 1 to 550 parts by weight of the inorganic filler which is surface-treated with components (g) and (i) should be blended based on 100 parts by weight of component (a'), as in blending the inorganic filler which is surface-treated with the silane or titanium compound as component (h). If the amount is less than the above or is in excess of the above, a sufficient effect cannot be obtained as mentioned above.

Various antioxidants can be used in the present invention, but particularly preferred are phosphorus antioxidants including monophosphites and diphosphites, and phenolic antioxidants. Typical examples of monophosphites are tris(2,4-di-tert-butylphenyl)phosphite, and tris(mono or dinonylphenyl)phosphite.

Preferred diphosphites are the phosphorus compounds represented by the formula:

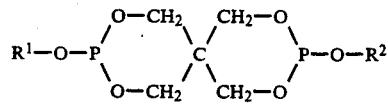

(wherein $R^1$ and $R^2$ are each an alkyl group having 1 to 20 carbon atoms, a cycloalkyl group having 3 to 20 carbon atoms, or an aryl group having 6 to 20 carbon atoms)

Typical examples of the phosphorus compounds represented by the above formula are distearylpentaerythritol diphosphite, dioctylpentaerythritol diphosphite, diphenylpentaerythritol diphosphite, bis(2,4-di-tert-butylphenyl)pentaerythritol diphosphite, bis(2,6-di-tert-butyl-4-methylphenyl)pentaerythritol diphosphite, and dicyclohexylpentaerythritol diphosphite and the like.

Various known compounds can be used as phenolic antioxidant. Representative examples of them are 2,6-di-tert-butyl-4-methylphenol, 2,6-diphenyl-4-methoxyphenol, 2,2'-methylenebis(6-tert-butyl-4-methylphenol), 2,2'-methylenebis(4-methyl-6-(60-methylcyclohexyl)-phenol), 1,1-bis(5-tert-butyl-4-hydroxy-2-methylphenyl)butane, 2,2'-methylenebis(4-methyl-6-cyclohexylphenol), 2,2'-methylenebis(4-methyl-6-nonylphenol), 1,1,3-tris(5-tert-butyl-4-hydroxyl-2-methylphenol)butane, 2,2-bis(5-tert-butyl-4-hydroxy-2-methylphenyl)-4-n-dodecylmelcaptobutane, ethyleneglycolbis(3,3-bis(3-tert-butyl-4-hydroxyphenol)-butylate), 1-1-bis(3,5-dimethyl-2-hydroxyphenol)-3-(n-dodecylthio)butane, 4,4'-thiobis(6-tert-butyl-3-methylphenol), 1,3,5-tris(3,5-di-tert-butyl-4-hydroxybenzyl)-2,4,6-trimethylbenzene, 2,2-bis(3,5-di-tert-butyl-4-hydroxybenzyl)malonic acid dioctadecyl ester, n-octadecyl-3-(4-hydroxy-3,5-di-tert-butylphenyl)propionate, and tetrakis(methylene(3,5-di-tert-butyl-4-hydroxyhydrocinnamate))methane.

The above antioxidant is compounded in the amount of 0.0001 to 2 parts by weight, preferably 0.001 to 1 parts by weight per 100 parts by weight of the styrene-based resin having the syndiotactic configuration mentioned before.

Furthermore, a metal salt of an organic acid and/or an organic phosphorus compound can be added as the nuclear agent. These include various compounds, and the metal salt of the organic acid includes, for example, a metal salt such as sodium salt, calcium salt, aluminum salt or magnesium salt of an organic acid such as benzoic acid, p-(tert-butyl)benzoic acid, cyclohexane carboxylic acid (hexahydrobenzoic acid), aminobenzoic acid, β-naphthoeic acid, cyclopentane carboxylic acid, succinic acid, diphenylacetic acid, glutaric acid, isonicotinic acid, adipic acid, sebacic acid, phthalic acid, isophthalic acid, benzenesulfonic acid, glycolic acid, caproic acid, isocaproic acid, phenylacetic acid, cinnamic acid, lauric acid, myristic acid, palmitic acid, stearic acid and oleic acid. Among these, aluminum salt of p-(tert-butyl)benzoic acid, sodium salt of cyclohexane carboxylic acid and sodium salt of β-naphthoeic acid are particularly preferred.

In addition, the organic phosphorus compound includes an organic phosphorus compound (bl) represented by the formula:

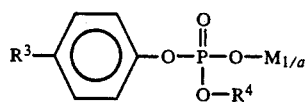
[B-I]

(wherein $R^3$ represents a hydrogen atom or an alkyl group having 1 to 18 carbon atoms; $R^4$ represents an alkyl group having 1 to 18 carbon atoms,

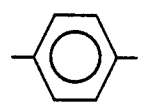

$R^3$ or $M_{1/a}$; M represents Na, K, Mg, Ca or Al; and a represents an atomic valence of M) or an organic phosphorus compound (b2) represented by the formula:

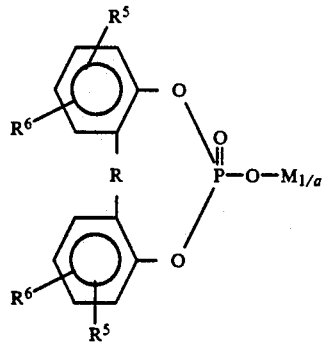
[B-II]

(wherein R represents methylene group, ethylidene group, propylidene group or isopropylidene group, $R^5$ and $R^6$ each represents a hydrogen atom or an alkyl group having 1 to 6 carbon atoms; and M and a have the same meanings as those defined above).

More detailed examples of the nuclear agent above are described in Japanese Patent Application Laid-Open No. 201350/1989. The amount is 0.01 to 15 parts by weight, preferably 0.05 to 5 parts by weight based on 100 parts by weight of components (a) and (b).

The resin composition of the present invention can be obtained by blending the respective components above and kneading them at an optical temperature, for example, 270° to 320° C. Blending and kneading can be carried out by the conventional manner, more specifically, they can be carried out by the melt-kneading method or the solution blending method using a kneader, mixing roll, extruder, Banbury mixer, Henschel mixer or kneading roll.

Various molding materials can be produced using the resin composition of the present invention. Shapes, molding process and crystallinity of the molding material are not particularly limited and can be determined depending on the characteristics required of the molding material to be produced. For example, the shape may be either a sheet-like or a three-dimensional structural material such as an container, and the molding process can be applied depending on the shape of the molding material, such as extrusion molding, injection molding, compression molding and blow molding. Furthermore, the degree of crystallization may be any of crystalline or amorphous.

According to the present invention, a polystyrene-based resin composition, which has improved affinity and dispersibility with no laminar peeling, excellent appearance and improved mechanical strength, can be obtained without complex process.

The surface-treated inorganic filler of the present invention also has excellent adhesiveness, particularly with the styrene-based polymer and can improve the mechanical properties of the styrene-based polymer.

Accordingly, the present invention can be expected to be widely used for preparing various molding materials such as electric and electronic materials, industrial structural materials, domestic electric appliances, haberdashers and automobile parts such as connectors, coil bobbins, printed circuit boards, door panels and cylinder head covers.

The present invention is described in greater detail with reference to the following examples.

REFERENCE EXAMPLE 1

(Preparation of Polystyrene having Syndiotactic Configuration)

32 L (L=liter) or toluene as a solvent, and 1335 mmol (as aluminum atom) of methylaluminoxane and 13.4 mmol of tetraethoxytitanium as catalyst components were placed in a reactor to which 15 kg of styrene was introduced and polymerized for 2 hours at 55° C.

After polymerization, the reaction product was washed with a mixture of sodium hydroxide and methanol to decompose and remove the catalyst components, and was then dried to obtain 2.1 kg of a styrene polymer (polystyrene). The polymer was subjected to Soxhlet extraction using methyl ethyl ketone as a solvent to obtain 95% by weight of an extraction residue. The weight average molecular weight of the polymer was 400,000 and the melting point was 270° C. A $^{13}$C-NMR analysis showed absorption at 145.35 ppm, which is ascribable to the syndiotactic configuration, and the syndiotacticity indicated in terms of a racemic pentad, as calculated from the peak area, was 98%.

REFERENCE EXAMPLE 2

(Preparation of Styrene-Maleic anhydride copolymer)

3.68 g of 1,1-bis(tert-butylperoxy)-3,3,5-trimethylcyclohexane as a polymerization initiator was added to 10 kg of styrene monomer and 0.35 kg of maleic anhydride. The resulting mixture was stirred and then allowed to stand at room temperature overnight, and was filtered through a filter paper to obtain a starting material for polymerization. After replacing with styrene monomer inside an autoclave made of stainless and having a volume of 2 L, the temperature was raised to 100° C and the starting material for polymerization was introduced into the autoclave at a rate of 8 ml/min, and 4 L of a liquid material was distilled from the autoclave. The viscous liquid material distilled after the above liquid material, was introduced to a large amount of hexane to precipitate a styrene-maleic anhydride copolymer resin. After removing the hexane, its composition was analyzed with a $^{13}$C-NMR to give the result of styrene/maleic anhydride =99/1 mol %. In addition, the weight average molecular weight measured by a gel permeation chromatography (GPC) gave the result of 200,000.

EXAMPLE 1

One part by weight of a styrene-glycidyl methacrylate copolymer having a weight average molecular weight of 100,000 and the proportion of styrene/glycidyl methacrylate =95/5 mol % was added to 100 parts by weight of a mixture comprising 70% by weight of the polystyrene having a syndiotactic configuration obtained in Reference Example 1 and 30% by weight of Nylon 6 (trade mark: Ube Nylon 1013B, produced by Ube Industries, Ltd.) as the polyamide. The mixture was pelletized after being melted, blended and kneaded at 280° C. and 50 rpm using a single-screw extruder having a Dalmage-type screw with a diameter of 20 mm and L/D =20. These pellets were injection molded to form a test piece, which was then measured for various properties. The results are shown in Table 2. In addition, a non-oriented circular-shaped molding material having a diameter of 2.5 cm and a thickness of 4 mm was prepared from these pellets by using a press-molding machine. After this molding product was subjected to mirror polishing using an ultramicrotome, it was then etched with chromic acid and its dispersed state was observed using a scanning electron microscope. The results are shown in Table 2. The ratio of the composition is also shown in Table 1.

EXAMPLES 2 to 14 and COMPARATIVE EXAMPLES 1 to 8

The procedure of Example 1 was repeated with the exception that the ratio of the composition was replaced with those shown in Table 1 to produce molding products. Their physical properties measured are shown in Table 2.

The substances used in Examples and Comparative Examples are as follows:

Component (a)

SPS: Polystyrene having syndiotactic configuration obtained in Reference Example 1.

Component (b)

Nylon 6: Trade mark; Ube Nylon 1013 B, produced by Ube Industries, Ltd.

Nylon 6.6: Trade mark; Ube Nylon 2013, produced by Ube Industries, Ltd.

Polyarylate: Produced by Du Pont

PET: Polyethylene terephthalate, trade mark; Dianite MA-523, produced by Mitsubishi Rayon Co., Ltd.

PBT: Polybutyrene terephthalate, trade mark; Balox 310, produced by Engineering Plastic K.K.

Component (c)

ST-GMA: Styrene-glycidyl methacrylate copolymer, the weight average molecular weight: 100,000, Copolymerization ratio of styrene/glycidyl methacrylate =95/5 mole %, trade mark; Blenmer CP-1005S, produced by Nippon Oil & Fats, Co., Ltd.

SMA1: Styrene-maleic anhydride copolymer prepared in Reference Example 2.

SMA2: Styrene-maleic anhydride copolymer, the weight average molecular weight: 280,000, Copolymerization ratio of styrenemaleic anhydride =86/14 mole %, trade mark; Moremax UG 830, produced by Idemitsu Petrochemical Co., Ltd.

PS: Styrene homopolymer (containing no epoxy group nor carboxylic acid anhydride group), the weight average molecular weight: 300,000, trade mark; Idemitsu Polystyrene US 305, produced by Idemitsu Petrochemical Co., ltd.

Other additives

GF: Glass fiber, chopped strand, average fiber diameter: 13 μm and average fiber length: 3 mm, produced by Asahi Fiber Glass K.K.

SBS: Styrene-butadiene block copolymer rubber-like elastomer, styrene/butadiene =30/70 % by weight, the weight average molecular weight: 100,000, trade mark; Kraton D 1101.

TABLE 1

| No. | Component (a) Kinds | Component (a) % by weight | Component (b) Kinds | Component (b) % by weight | Component (c) Kinds | Component (c) Parts by weight | Other additives Kinds | Other additives Parts by weight |
|---|---|---|---|---|---|---|---|---|
| Example 1 | SPS | 70 | Nylon 6 | 30 | ST—GMA | 3 | — | 0 |
| Example 2 | " | 50 | " | 50 | " | 3 | — | 0 |
| Example 3 | " | 30 | " | 70 | " | 3 | — | 0 |
| Example 4 | " | 80 | " | 20 | SMA1 | 0.5 | — | 0 |
| Example 5 | " | 15 | " | 85 | " | 5 | — | 0 |
| Comparative Example 1 | " | 50 | " | 50 | — | 0 | — | 0 |
| Comparative Example 2 | " | 50 | " | 50 | ST—GMA | 20 | — | 0 |
| Comparative Example 3 | " | 15 | " | 85 | SMA2 | 5 | — | 0 |
| Comparative Example 4 | " | 15 | " | 85 | PS | 5 | — | 0 |
| Example 6 | " | 25 | Nylon 6·6 | 75 | ST—GMA | 1 | — | 0 |
| Example 7 | " | 50 | " | 50 | " | 3 | GF | 43 |
| Comparative Example 5 | SPS | 50 | Nylon 6·6 | 50 | — | 0 | GF | 43 |
| Example 8 | " | 70 | Polyarylate | 30 | ST—GMA | 1 | — | 0 |
| Example 9 | " | 70 | " | 30 | " | 2 | — | 0 |
| Example 10 | " | 70 | " | 30 | " | 3 | — | 0 |
| Example 11 | " | 70 | " | 30 | " | 5 | — | 0 |
| Comparative Example 6 | " | 70 | " | 30 | — | 0 | — | 0 |
| Example 12 | " | 30 | " | 70 | ST—GMA | 3 | SBS | 30 |
| Example 13 | " | 25 | PET | 75 | " | 3 | GF | 43 |
| Comparative Example 7 | " | 25 | " | 75 | — | 0 | GF | 43 |
| Example 14 | " | 70 | PBT | 30 | ST—GMA | 2 | GF | 43 |
| Comparative Example 8 | " | 70 | " | 30 | — | 0 | GF | 43 |

TABLE 2

| No. | Visual Observation Appearance of injection molding product | Observation with electron microscope Size of dispersed phase (μm) | JIS-K 7203 Bending strength (kgf/cm$^2$) | JIS-K 7207 or K 7206 Heat resistance (Thermal distortion temperature) (°C.) | Evaluation method |
|---|---|---|---|---|---|
| Example 1 | Good | 0.5 to 2.0 | 1000 | 249 | JIS-K 7206 (Vicat) |
| Example 2 | Good | 2.0 to 5.0 | 1100 | 238 | " |
| Example 3 | Good | 1.0 to 3.0 | 1000 | 227 | " |
| Example 4 | Good | 1.0 to 2.0 | 1000 | 246 | " |
| Example 5 | Good | 2.0 to 3.0 | 1100 | 218 | " |
| Comparative Example 1 | Phase separation | 5.0 to 30.0 | 850 | 233 | " |
| Comparative Example 2 | Surface roughness | Uniform phase | 790 | 197 | " |
| Comparative Example 3 | Surface roughness | 4.0 to 20.0 | 800 | 213 | " |
| Comparative Example 4 | Phase separation | 5.0 to 30.0 | 800 | 207 | " |
| Example 6 | Good | 2.0 to 5.0 | 1100 | 254 | " |
| Example 7 | Good | — | 2000 | 250 | JIS-K 7207 Heavy load |
| Comparative Example 5 | Phase separation | — | 1800 | 246 | " |
| Example 8 | Good | 1.0 to 7.0 | 920 | 243 | JIS-K 7206 (Vicat) |
| Example 9 | Good | 0.7 to 4.0 | 970 | 245 | " |
| Example 10 | Good | 0.5 to 2.0 | 1000 | 242 | " |
| Example 11 | Good | 0.2 to 2.0 | 970 | 240 | " |
| Comparative Example 6 | Phase separation | 5.0 to 30.0 | 830 | 235 | " |
| Example 12 | Good | 1.0 to 2.0 | 850 | 210 | " |
| Example 13 | Good | — | 2000 | 239 | JIS-K 7207 Heavy load |
| Comparative Example 7 | Phase separation | — | 1700 | 233 | " |
| Example 14 | Good | — | 1500 | 232 | " |
| Comparative Example 8 | Phase separation | — | 1300 | 228 | " |

REFERENCE EXAMPLE 3

(Preparation of maleic anhydride-modified styrene-hydrogenated butadiene-styrene block copolymer)

One kilogram of styrene-ethylene-butylene block copolymer (trade mark: Kraton G 1650, produced by Shell Chemical Co., Ltd.), 20 g of maleic anhydride and 5 g of dicumyl peroxide were subjected to dry blending at room temperature. The mixture was melted, kneaded and pelletized using a twin-screw extruder with vent rotating in same direction (screw diameter of 30 mm and L/D =22) at 300° C. and rotational frequency of 50 rpm to give a maleic anhydride-modified styrene-hydrogenated butadiene-styrene block copolymer.

After 2 g of the pellets obtained were pulverized. The resulting powders were subjected to Soxhlet extraction using 100 ml of acetone for 10 hours. Then, the residue was dried at 60° C for 24 hours under a reduced pressure to obtain a sample. This sample had a specific absorption in the infrared spectrum (IR) at 1785 cm$^1$, whereby graft copolymerization of maleic anhydride can be confirmed.

EXAMPLES 15 to 18

(a) Polystyrene having a syndiotactic configuration obtained by Reference Example 1, (d) Nylon 6.6, (e) maleic acid-modified styrene-hydrogenated butadiene-styrene block copolymer and (f) styrene-hydrogenated butadiene-styrene block copolymer were blended with the amounts shown in Table 3, and the mixture was kneaded and pelletized using a twin-screw extruder (having an inner diameter of 20 mm) at 300° C., and then molded using an injection molding machine (trade mark: MIN-7, produced by Niigata Tekko K.K.). The Izod impact resistance with respect to the molded products was measured according to JIS K 7110.

A weight change rate (%) of the Izod test piece after being dipped in hot water and boiled for 8 hours was used as an index of hot water resistance. The vicat softening point was measured according to JIS K 7206. The results are shown in Table 4.

EXAMPLE 19

The procedure in Example 15 was repeated with the exception that components (d) is replaced with Nylon 6, and (e) is replaced with the maleic anhydride-modified styrene-hydrogenated butadiene-styrene block copolymer obtained in Reference Example 3 and the blending ratio was changed to that shown in Table 3. The results are shown in Table 4.

COMPARATIVE EXAMPLES 9 to 12

The procedure in Example 15 was repeated with the exception that the blending ratio was changed to that shown in Table 3. The results are shown in Table 4.

TABLE 3

| No. | Component (a) Kinds[*1] | Component (a) Parts by weight | Component (b) Kinds | Component (b) Parts by weight | Component (e) Kinds | Component (e) Parts by weight | Component (f) Kinds | Component (f) Part by weight |
|---|---|---|---|---|---|---|---|---|
| Example 15 | SPS | 70 | Nylon 6·6[*2] | 30 | Malein SEBS[*4] | 20 | — | 0 |
| Example 16 | SPS | 50 | Nylon 6·6[*2] | 50 | Malein SEBS[*4] | 20 | — | 0 |
| Example 17 | SPS | 30 | Nylon 6·6[*2] | 70 | Malein SEBS[*4] | 20 | — | 0 |
| Example 18 | SPS | 70 | Nylon 6·6[*2] | 30 | Malein SEBS[*4] | 5 | SEBS[*6] | 15 |
| Example 19 | SPS | 30 | Nylon 6[*3] | 70 | Malein SEBS[*5] | 20 | — | 0 |
| Comparative Example 9 | SPS | 100 | Nylon 6·6[*2] | 0 | Malein SEBS[*4] | 20 | — | 0 |
| Comparative Example 10 | — | 0 | Nylon 6·6[*2] | 100 | — | 0 | — | 0 |
| Comparative Example 11 | SPS | 70 | Nylon 6·6[*2] | 30 | — | 0 | — | 0 |
| Comparative Example 12 | SPS | 70 | Nylon 6·6[*2] | 30 | — | 0 | SEBS[*6] | 20 |

[*1]Polystyrene having the syndiotactic configuration obtained in Reference Example 1
[*2]trade mark: Ube Nylon 2023, produced by Ube Industries, Ltd.
[*3]trade mark: Ube Nylon 1030, produced by Ube Industries, Ltd.
[*4]Maleic acid-modified styrene-hydrogenated butadiene-styrene block copolymer, trade mark: Kraton FG-1901X, produced by Shell Chemical Co., Ltd.
[*5]Maleic acid-modified styrene-hydrogenated butadiene-styrene block copolymer obtained in Reference Example 3
[*6]Styrene-hydrogenated butadiene-styrene block copolymer, trade mark: Kraton G-1652, produced by Shell Chemical Co., Ltd.

TABLE 4

| No. | Izot impact resistance (kgf·cm/cm) | Weight change[*1] (%) | Vicat softening point (°C.) |
|---|---|---|---|
| Example 15 | 4.7 | 1.8 | 255 |
| Example 16 | 6.8 | 2.3 | 248 |
| Example 17 | 13.6 | 3.1 | 243 |
| Example 18 | 5.2 | 1.7 | 255 |
| Example 19 | 15.0 | 3.7 | 233 |
| Comparative Example 9 | 2.0 | 1.5 | 259 |
| Comparative Example 10 | 4.9 | 8.1 | 243 |
| Comparative Example 11 | 1.6 | 1.9 | 257 |
| Comparative Example 12 | 2.3 | 1.7 | 253 |

[*1]Weight change (%) = $\frac{\text{weight after dipping} - \text{weight before dipping}}{\text{weight before dipping}} \times 100$

REFERENCE EXAMPLE 4

(Preparation of Polystyrene having a Syndiotactic Configuration)

Two liters of toluene used as a solvent, and 5 mmol of tetraethoxytitanium and 500 mmol (as aluminum atom) of methylaluminoxane used as catalyst components were placed in a reactor, and 15 L of styrene was introduced thereinto and polymerized for 4 hours at 55° C. After polymerization, the reaction product was washed with a mixture of hydrochloric acid and methanol to decompose and remove the catalyst components, and then dried to obtain 2.5 kg of a styrene polymer (polystyrene). The polymer was subjected to Soxhlet extraction using methyl ethyl ketone as a solvent to obtain 97% by weight of an extraction residue. The weight average molecular weight of the polymer was 400,000, the number average molecular weight thereof was 180,000 and the melting point was 269° C. A $^{13}$C-

NMR analysis (solvent: 1,2-dichlorobenzene) showed an absorption at 145.35 ppm, which was ascribable to the syndiotactic configuration, and the syndiotacticity indicated in terms of racemic pentad calculated from the peak area was 98%.

EXAMPLE 20

To 100 parts by weight of the syndiotactic polystyrene obtained in Reference Example 4 were added 0.7 part by weight of (2,6-di-tert-butyl-4-methylphenyl) pentaerythritol diphosphite (trade mark: PEP-36, produced by Adeka Argus Co., Ltd.) and 0.1 part by weight of 2,6-di-tert-butyl-4-phenol trademark: Sumilizer BHT, produce by Sumitomo Chemical Co., Ltd.) as anti-oxidants and a further 1 part by weight of aluminum p-(tert-butyl)benzoate (trade name: PTBBA-Al, produced by Dainippon Ink & Chemicals Inc.) and 5 parts by weight of styrene-glycidyl methacrylate (5 mole %) copolymer (trade mark: Blenmer CP 1005S, produced by Nippon Oil & Fats, Co., Ltd., Mw+10×10$^4$) were added. The mixture was then dry blended. Then, while side feeding 43 parts by weight of glass fiber surface-treated with γ-aminopropyltrimethoxy silane (aminosilane-type coupling agent), the mixture was pelletized using a twin-screw extruder.

These pellets were injection molded to form test pieces for a bending test and a Izod test. Using the resulting test pieces, bending test, a thermal distortion test and Izod test were carried out. The results are shown in Table 6.

EXAMPLES 21 to 28 and COMPARATIVE EXAMPLES 13 to 17

The procedure in Example 20 was repeated with the exception that the components and the proportions thereof were changed as shown in Table 5. The results are shown in Table 6.

In addition, in Example 29, the procedure for Example 20 was repeated with the exception that, using Henschel mixer with 20 L-volume, 0.3 parts by weight of γ-aminopropyltriethoxy silane was sprayed to 100 parts by weight of talc and mixed at 60° to 100° C. and 1000 rpm for 5 minutes, then 50 parts by weight of said talc were added to 100 parts by weight of syndiotactic polystyrene at the time of dry blending.

Furthermore, in Example 30, the procedure in Example 29 was repeated except for replacing talc with calcium carbonate.

TABLE 5

| No. | Component (a') Styrene polymer | | Component (g) Epoxy group-containing Styrene-based polymer | | | | Component (h) Inorganic filler | | Component (c) (Surfactant) |
|---|---|---|---|---|---|---|---|---|---|
| | Kinds | Parts by weight | Kinds | Molecular weight | Content of epoxy group-containing vinyl compound unit (mole %) | Parts by weight | Kinds | Parts by weight | |
| Example 20 | SPS*$^1$ | 100 | CP1005S*$^4$ | 10 × 10$^4$ | 5 | 5 | CS—GF*$^7$ | 43 | Aminosilane |
| Comparative Example 13 | SPS*$^1$ | 100 | — | — | — | — | CS—GF*$^7$ | 43 | Aminosilane |
| Example 21 | GPPS*$^2$ | 100 | CP1005S*$^4$ | 10 × 10$^4$ | 5 | 5 | CS—GF*$^8$ | 43 | Aminosilane |
| Comparative Example 14 | GPPS*$^2$ | 100 | — | — | — | — | CS—GF*$^8$ | 43 | Aminosilane |
| Example 22 | HIPS*$^3$ | 100 | CP1005S*$^4$ | 10 × 10$^4$ | 5 | 5 | CS—GF*$^7$ | 43 | Aminosilane |
| Comparative Example 15 | HIPS*$^3$ | 100 | — | — | — | — | CS—GF*$^7$ | 43 | Aminosilane |
| Example 23 | SPS*$^1$ | 100 | CP1005S*$^4$ | 10 × 10$^4$ | 5 | 0.1 | CS—GF*$^7$ | 43 | Aminosilane |
| Example 24 | SPS*$^1$ | 100 | CP1005S*$^4$ | 10 × 10$^4$ | 5 | 1 | CS—GF*$^7$ | 43 | Aminosilane |
| Example 25 | SPS*$^1$ | 100 | CP1005S*$^4$ | 10 × 10$^4$ | 5 | 10 | CS—GF*$^7$ | 43 | Aminosilane |
| Example 26 | SPS*$^1$ | 100 | CP20S*$^5$ | 1 × 10$^4$ | 20 | 5 | CS—GF*$^7$ | 43 | Aminosilane |
| Comparative Example 16 | SPS*$^1$ | 100 | CP20S*$^5$ | 1 × 10$^4$ | 20 | 50 | CS—GF*$^7$ | 43 | Aminosilane |
| Comparative Example 17 | SPS*$^1$ | 100 | CP50S*$^6$ | 1.1 × 10$^4$ | 50 | 5 | CS—GF*$^7$ | 43 | Aminosilane |
| Example 27 | SPS*$^1$ | 100 | CP1005S*$^4$ | 10 × 10$^4$ | 5 | 5 | CS—GF*$^7$ | 20 | Aminosilane |
| Example 28 | SPS*$^1$ | 100 | CP1005S*$^4$ | 10 × 10$^4$ | 5 | 5 | CS—GF*$^7$ PW—GF*$^9$ | 43 20 | Aminosilane Aminosilane |
| Example 29 | SPS*$^1$ | 100 | CP1005S*$^4$ | 10 × 10$^4$ | 5 | 5 | CS—GF*$^7$ Talc*$^{10}$ | 100 50 | Aminosilane Aminosilane |
| Example 30 | SPS*$^1$ | 100 | CP1005S*$^4$ | 10 × 10$^4$ | 5 | 5 | CS—GF*$^7$ Calcium*$^{11}$ carbonate | 80 20 | Aminosilane Aminosilane |

*$^1$Reference Example 4
*$^2$Idemitsu Polystyrol HH30E, produced by Idemitsu Petrochemical Co., Ltd.
*$^3$Idemitsu Polystyrol IT40, produced by Idemitsu Petrochemical Co., Ltd.
*$^4$Blenmer CP 1005S, Styrene-Glycidyl methacrylate (5 mole %) copolymer, produced by Nippon Oil & Fats, Co., Ltd.
*$^5$Blenmer CP 20S, Styrene-Glycidyl methacrylate (20 mole %) Copolymer, produced by Nippon Oil & Fats, Co., Ltd.
*$^6$Blenmer CP 50S, Styrene-Glycidyl methacrylate (50 mole %) Copolymer, produced by Nippon Oil & Fats, Co., Ltd.
*$^7$Chopped Strand: treated with γ-aminopropyltriethoxy silane, Average fiber diameter: 13 μm, Average fiber length: 3 mm
*$^8$Chopped Strand: treated with N-β-(aminoethyl)-γ-aminopropyltrimethoxy silane, Average fiber diameter: 13 μm, Average fiber length: 3 mm.
*$^9$Glass powder: treated with γ-aminopropyltriethoxy silane, Average fiber diameter: 9 μm, Average fiber length: 70 μm.
*$^{10}$Talc: FFR, produced by Asada Seifun K.K., treated with γ-aminopropyltriethoxy silane, Average particle size: 0.6 μm.
*$^{11}$Calcium carbonate: KS "1300", produced by Kanehira Kogyo K.K., treated with γ-aminopropyltriethoxy silane, Average particle size: 3 μm.

TABLE 6

| No. | Bending*$^1$ strength (kg/cm$^2$) | Bending*$^1$ elasticity (kg/cm$^2$) | Izot impact resistance*$^2$ (with notch) (kg · cm/cm) | Thermal distortion*$^3$ (18.5 kg/cm$^2$) °C. |
|---|---|---|---|---|
| Example 20 | 1,650 | 115,400 | 7.5 | 249 |
| Comparative Example 13 | 1,420 | 85,200 | 4.3 | 242 |
| Example 21 | 1,640 | 103,100 | 7.5 | 101 |
| Comparative Example 14 | 1,380 | 89,800 | 4.1 | 92 |
| Example 22 | 1,560 | 98,600 | 7.6 | 90 |
| Comparative Example 15 | 1,270 | 78,600 | 5.0 | 82 |
| Example 23 | 1,540 | 123,400 | 6.5 | 251 |

TABLE 6-continued

| No. | Bending[*1] strength (kg/cm²) | Bending[*1] elasticity (kg/cm²) | Izot impact resistance[*2] (with notch) (kg · cm/cm) | Thermal distortion[*3] (18.5 kg/cm²) °C. |
|---|---|---|---|---|
| Example 24 | 1,580 | 114,800 | 7.0 | 250 |
| Example 25 | 1,580 | 109,900 | 7.7 | 253 |
| Example 26 | 1,530 | 99,800 | 6.8 | 248 |
| Comparative Example 16 | 1,440 | 90,300 | 5.2 | 240 |
| Comparative Example 17 | 1,370 | 89,100 | 4.1 | 239 |
| Example 27 | 1,520 | 100,200 | 6.6 | 247 |
| Example 28 | 1,650 | 134,800 | 6.7 | 249 |
| Example 29 | 1,730 | 154,500 | 6.8 | 258 |
| Example 30 | 1,690 | 149,300 | 6.9 | 257 |

[*1]According to JIS-K-7203,
[*2]According to JIS-K-7110,
[*3]According to JIS-K-7207

EXAMPLES 31 to 38 and COMPARATIVE EXAMPLES 18 to 22

Glass fiber having a diameter of 13 μm and an average fiber length of 3 mm was coated with the surface treating agents shown in Table 7 by spraying, and then the surface-treated inorganic filler was dried.

To 100 parts by weight of the syndiotactic polystyrene obtained in the above Reference Example 4 were added 0.7 part by weight of (2,6-di-tert-butyl-4-methylphenyl) pentaerythritol diphosphite (trade mark: PEP-36, produced by Adeka Argus Co., Ltd.) and 0.1 part by weight of 2,6-di-tert-butyl-4-phenol (trade mark: Sumilizer BHT, produced by Sumitomo Chemical Industries Ltd.) as anti-oxidants and further 1 part by weight of aluminum p-(tert-butyl)benzoate (trade mark: PTBBA-Al, produced by Dainippon Ink & Chemicals Inc.) was added thereto, and the mixture was dry blended. Then, while side-feeding 43 parts by weight (100 parts by weight in EXAMPLE 38) of the surface-treated glass fiber as mentioned above, the mixture was pelletized using a twin-screw extruder.

The pellets were injection molded to form test pieces for a bending test and an Izod test. Using the resulting test pieces, bending test, thermal distortion test and Izod test were carried out. The prescription of the surface treating agents is shown in Table 7 and the results for the physical properties are shown in Table 8.

The process for preparing the surface treating agent used here is shown below.

Preparation of Surface Treating Agent

Styrene-glycidyl methacrylate (5 mole %) copolymer (trade mark: Blenmer CP 1005S, produced by Nippon Oil & Fats Co., Ltd., Mw = $10 \times 10^4$) was previously dissolved in toluene to prepare a 40% by weight solution.

A surface-treating agent was prepared by blending 7.5 parts by weight of the above solution, 1.0 part by weight of γ-aminopropyltriethoxy silane (produced by Nippon Unicar, Silane coupling agent, A-1100), 0.1 part by weight of nonionic lubricant (produced by Sanyo Kasei K.K., Chemitiren SGF-6) as a lubricant and 95.9 parts by weight of water.

TABLE 7

| No. | Component (a') Styrene-based polymer | Composition ratio based on 100 parts by weight of Glass Fiber (parts by weight) | | Surface treating agent | | | |
|---|---|---|---|---|---|---|---|
| | | Component (g) | Component (i) | Component (g) (% by weight) | Component (i) (% by weight) | Lubricant[*11] (% by weight) | Water (% by weight) |
| Example 31 | SPS[*7] | 0.94 | 0.31 | CP1005P[*1] 3 | Si-1[*5] 1.0 | 0.1 | 95.9 |
| Example 32 | SPS[*7] | 0.81 | 0.16 | CP1005P[*1] 5 | Si-1[*5] 1.0 | 0.1 | 93.9 |
| Example 33 | SPS[*7] | 1.04 | 0.17 | CP1005P[*1] 6 | Si-1[*5] 1.0 | 0.1 | 92.9 |
| Comparative Example 18 | SPS[*7] | 0.04 | 0.83 | CP1005P[*1] 0.1 | Si-1[*5] 1.0 | 0.1 | 98.8 |
| Comparative Example 19 | SPS[*7] | 8.0 | 0.37 | CP1005P[*1] 25 | Si-1[*5] 1.0 | 0.1 | 73.9 |
| Comparative Example 20 | SPS[*7] | 1.16 | 0.01 | CP1005P[*1] 5 | Si-1[*5] 0.03 | 0.1 | 94.9 |
| Example 34 | SPS[*7] | 0.93 | 0.18 | CP20S[*2] 5 | Si-1[*5] 1.0 | 0.1 | 93.9 |
| Comparative Example 21 | SPS[*7] | 0.90 | 0.18 | Movinyl DC[*3] 5 | Si-1[*5] 1.0 | 0.1 | 93.9 |
| Comparative Example 22 | SPS[*7] | 0.82 | 0.16 | Pondic[*4] 5 | Si-1[*5] 1.0 | 0.1 | 93.9 |
| Example 35 | SPS[*7] | 0.80 | 0.16 | CP1005P[*1] 5 | Si-2[*6] 1.0 | 0.1 | 93.9 |
| Example 36 | GPPS[*8] | 0.93 | 0.18 | CP1005P[*1] 5 | Si-2[*6] 1.0 | 0.1 | 93.9 |
| Example 37 | HIPS[*9] | 1.16 | 0.22 | CP1005P[*1] 5 | Si-2[*6] 1.0 | 0.1 | 93.9 |
| Example 38 | SPS[*7] | 0.94 | 0.31 | CP1005P[*1] 3 | Si-1[*5] 1.0 | 0.1 | 95.9 |

[*1]Blenmer CP 1005S, produced by Nippon Oil & Fats Co., Ltd., Styrene-Glycidyl methacrylate (5 mole %) copolymer, Mw = $10 \times 10^4$, was dissolved in toluene and used as a 40% by weight toluene solution.
[*2]Blenmer CP 20S, produced by Nippon Oil & Fats Co., Ltd. Styrene-Glycidyl methacrylate (20 mole %) copolymer, Mw = $10 \times 10^4$, was dissolved in toluene and used as a 40% by weight toluene solution.
[*3]Emulsion containing 56% by weight of polyvinyl acetate, produced by Hoechst AG, Movinyl DC.
[*4]Polyurethane emulsion, produced by Dainippon Ink & Chemicals Inc. Pondic 1310P.
[*5]γ-Aminopropyltriethoxysilane, produced by Nippon Unicar K.K., Silane coupling agent A-1100.
[*6]N-phenyl-γ-aminopropyltriethoxysilane, produced by Toray Silicone Co., Ltd., Silane coupling agent SZ6083.
[*7]Reference Example 4
[*8]Idemitsu Polystyrol HH30E, produced by Idemitsu Petrochemical Co., ltd.
[*9]Idemitsu Polystyrol IT40, produced by Idemitsu Petrochemical Co., ltd.
[*10]Nonionic lubricant, produced by Sanyo Kasei K.K., Chemitiren SGF-6.

TABLE 8

| No. | Bending[*1] strength (kg/cm²) | Bending[*1] elasticity (kg/cm²) | Izot impact resistance[*2] (with notch) (kg · cm/cm) | Thermal distortion[*3] (18.5 kg/cm²) °C. |
|---|---|---|---|---|
| Example 31 | 1,570 | 114,300 | 6.9 | 248 |
| Example 32 | 1,540 | 109,100 | 6.7 | 249 |
| Example 33 | 1,580 | 112,100 | 6.6 | 250 |
| Comparative Example 18 | 1,330 | 86,600 | 4.3 | 242 |
| Comparative Example 19 | 1,410 | 88,600 | 5.2 | 238 |

TABLE 8-continued

| No. | Bending*1 strength (kg/cm²) | Bending*1 elasticity (kg/cm²) | Izot impact resistance*2 (with notch) (kg·cm/cm) | Thermal distortion*3 (18.5 kg/cm²) °C. |
| --- | --- | --- | --- | --- |
| Comparative Example 20 | 1,320 | 82,500 | 4.3 | 242 |
| Example 34 | 1,520 | 100,000 | 6.8 | 252 |
| Comparative Example 21 | 1,270 | 85,700 | 4.0 | 239 |
| Comparative Example 35 | 1,260 | 86,800 | 4.2 | 240 |
| Example 35 | 1,550 | 110,700 | 6.9 | 249 |
| Example 36 | 1,580 | 117,300 | 6.8 | 102 |
| Example 37 | 1,500 | 97,600 | 6.7 | 89 |
| Example 38 | 1,550 | 130,000 | 6.5 | 255 |

*1According to JIS-K-7203,
*2According to JIS-K-7110,
*3According to JIS-K-7207.

What is claimed is:

1. A styrene-based resin composition which comprises
   (a) 100 parts by weight of a styrene-based polymer having a syndiotactic configuration and no functional group,
   (b) 0.01 to 30 parts by weight of a styrene-based polymer having an epoxy group and a weight average molecular weight of 1,000 to 50,000 and
   (c) 1 to 550 parts by weight of an inorganic filler surface treated by a silane compound or a titanium compound.

2. The composition of claim 1 wherein said styrene based polymer having an epoxy group is styrene-glycidyl methacrylate copolymer.

3. The composition of claim 2 wherein said inorganic filler is glass fiber.

4. The composition of claim 1 wherein said inorganic filler is glass fiber.

5. The composition of claim 1, wherein said styrene-based polymer having an epoxy group is a copolymer of a vinyl compound having an epoxy group selected from the group consisting of glycidyl methacrylate, glycidyl acrylate, vinyl glycidyl ether, glycidyl ether of hydroxyalkyl (meth)acrylate, glycidyl ether of polyalkyleneglycol (meth)acrylate and glycidyl itaconate.

6. A styrene-based resin composition which comprises
   (a) 100 parts by weight of a styrene-based polymer having a syndiotactic configuration and no functional group,
   (b) 0.01 to 30 parts by weight of a styrene-glycidyl methacrylate copolymer having a weight average molecular weight of 1,000 to 500,000, and
   (c) 1 to 550 parts by weight of an inorganic filler surface-treated by a silane compound.

* * * * *